United States Patent [19]

Gray

[11] Patent Number: 5,782,001
[45] Date of Patent: Jul. 21, 1998

[54] CIRCULAR SAW GUARD HOLD AND RELEASE DEVICE

[76] Inventor: John W. Gray, 976 Great Hill Rd., Guilford, Conn. 06437

[21] Appl. No.: 697,553

[22] Filed: Aug. 27, 1996

[51] Int. Cl.⁶ .................... B25F 5/00; B27B 9/00
[52] U.S. Cl. .................... 30/391; 30/390; 83/478
[58] Field of Search .............. 83/DIG. 1, 478; 30/391, 390

[56] References Cited

U.S. PATENT DOCUMENTS

| | | | |
|---|---|---|---|
| 2,722,246 | 11/1955 | Arnoldy | 30/391 |
| 3,063,481 | 11/1962 | Sutherland | 30/391 |
| 3,805,639 | 4/1974 | Peter | 30/391 X |
| 4,026,177 | 5/1977 | Lokey | 83/DIG. 1 X |
| 4,033,218 | 7/1977 | Donatelle | 83/DIG. 1 X |
| 4,672,746 | 6/1987 | Zeilenga | 30/391 |
| 4,693,008 | 9/1987 | Velie | 30/391 X |
| 4,698,910 | 10/1987 | Gundlach | 83/DIG. 1 X |
| 4,730,396 | 3/1988 | Nishioka | 30/391 X |
| 5,531,147 | 7/1996 | Serban | 83/478 |
| 5,579,584 | 12/1996 | Hoffman | 83/478 X |

FOREIGN PATENT DOCUMENTS

| | | | |
|---|---|---|---|
| 243485 | 2/1976 | Germany | 83/DIG. 1 |
| 48186 | 4/1977 | Japan | 83/DIG. 1 |

*Primary Examiner*—Eugenia Jones
*Assistant Examiner*—Charles Goodman
*Attorney, Agent, or Firm*—Bielen, Peterson & Lampe

[57] ABSTRACT

A hold-and-release device for the movable lower guard of a hand-operated circular saw in which the guard is held in its out-of-the-way position by a magnet or latch while a saw cut is being made but is automatically released to assume its normal protective position when the motor power is removed. Alternatives are described having different degrees of complexity, for example, one requires the operator to apply pressure to the trigger switch while engaging the guard-holding device.

3 Claims, 2 Drawing Sheets

1
CIRCULAR SAW GUARD HOLD AND RELEASE DEVICE

BACKGROUND OF THE INVENTION

This invention relates generally to a portable, hand-held circular saw and more particularly to the movable lower saw-blade guard.

This type of saw is designed to be held by one hand of the operator, by means of a pistol grip, and is actuated by a trigger in said grip similar to that of a pistol. The saw blade is circular and is made to rotate by an electric motor controlled by a switch connected to the trigger. The saw blade is partially enclosed by two protective guards to protect the operator and surrounding material as well as the blade itself. The upper guard covers the upper half of the blade and is rigidly attached to the motor and handle. The lower guard is rotatable about the center of rotation of the blade and is normally held in place around the lower half of the blade by a spring. It fits within the upper guard and may be rotated to an upper position to allow the saw to be employed in making an extended cut.

In the ordinary cutting of lumber, the lower guard is pushed to an out-of-the-way position by the lumber itself at the start of a cut, and held by the lumber during the cut, in opposition to the spring tension. When the saw passes beyond the lumber or is lifted from the cut, the spring immediately returns the guard to its lower, protective position. This immediate return is essential, as the blade continues to rotate for several seconds after electric power is removed, and the operator tends to lay the saw down on any convenient surface after making a cut.

Many situations arise in carpentry in which the above method of lifting the lower guard by action of the lumber is awkward or impossible. Such is the case when the cut is at a sharp angle to the edge of the work, or in a "pocket cut" where the saw is plunged into a surface. In these and similar instances, the operator must use his or her free hand to move the guard to and hold it in its out-of-the-way position by means of a lever which is provided for the purpose. Thus, the work cannot be held in place by the operator's free hand and must be secured by other means, often a time consuming inconvenience. Additionally, holding the guard in its retracted position is awkward and annoying. This specification therefore describes implementation which would enable the operator to rotate the guard out of the way before a cut is started, where it will remain without further assistance until the trigger is released to remove power from the saw, at which time it will automatically be released to be pulled by its return spring to its normal position. Thus, at the start of and during a cut, the operator may use his or her free hand to hold the work in place.

SUMMARY OF THE INVENTION

This invention relates to a hold and release device for a circular saw and may be implemented in alternate embodiments.

The simplest of the means to be described comprises an electromagnet having a coil and core affixed to the frame of the saw and a mating armature on the rotatable guard. The magnet is energized in parallel with the motor and is capable of holding the guard in its out-of-the-way position while the saw is running. In this instance, the operator must have the trigger depressed and the saw running while the guard is pulled to its out-of-the-way position, where it will be held by the energized magnet.

In a refinement of the above means, the electromagnet is energized not in parallel with the motor but by an auxiliary switch actuated by the trigger such that by pulling the trigger only part way, the operator may cause the guard to be held by the magnet before the motor is started.

Two alternative means are described in which the operator may engage the holding device before any employment of the trigger. One uses a mechanical latch; the other a permanent magnet. In the case of the latch, when the motor power is removed, the latch is opened by an electromagnet or solenoid. In the case of the permanent magnet, the guard is released by means of coils on the magnet pole-pieces which briefly overpower the permanent magnet flux when motor power ceases. In both cases, the release is achieved by a delayed-power circuit to be described.

Any of the above devices may be designed as integral parts of future models of circular saws, or added as attachments to existing saws. All the existing circular saws have hollow handles which can accommodate the necessary circuits, and holding devices may be mounted on the fixed upper guard.

DETAILED DESCRIPTION OF THE PREFERRED EMBODIMENTS

Figure 1A:
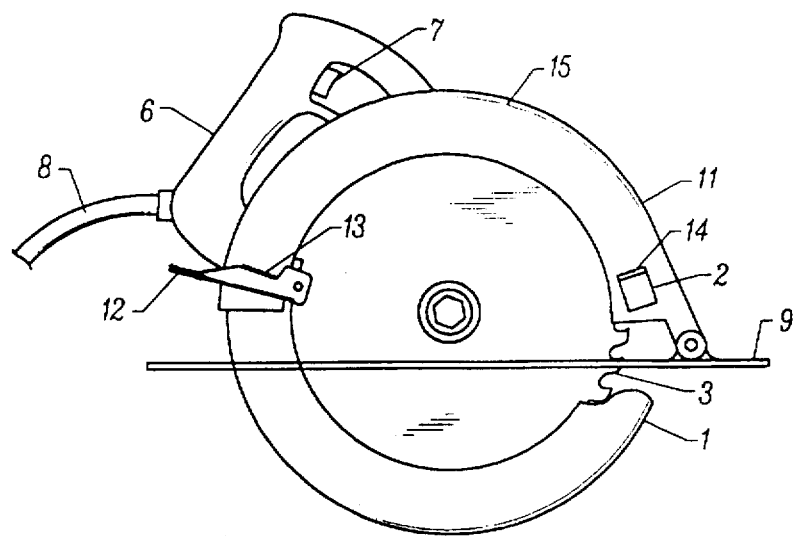
FIG. 1A is a drawing of a circular saw, with its lower guard in the normal position.
Figure 1B:
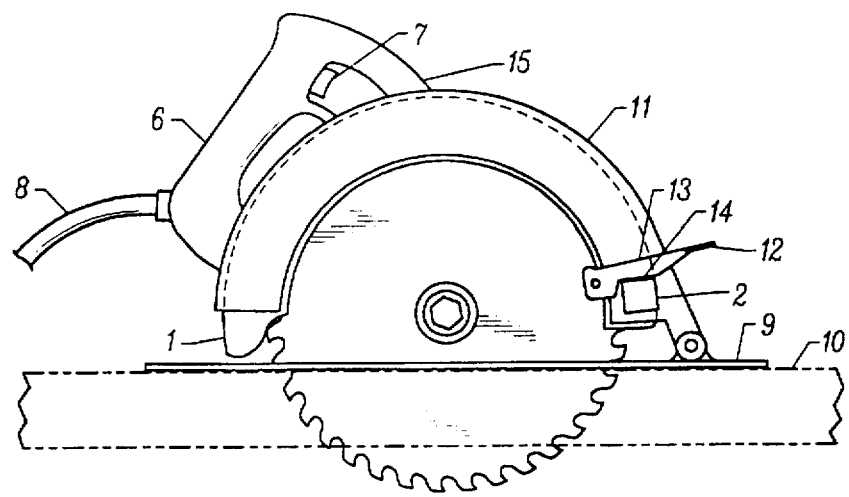
FIG. 1B is a drawing of a circular saw with the guard being held in its out-of-the-way position by a hold-and-release device.

Referring to FIGS. 1A and 1B, the first figure depicts a typical circular saw with its lower guard 1 in the relaxed, protective position and the second shows the same saw with the guard 1 held in its out-of-the-way position by a hold-and-release device 2 as described herein. The views in FIG. 1 do not show the electric motor which is contained within the saw housing 15 behind the saw blade 3, the latter being fastened to the end of the motor shaft by screw 4 and cupped washer 5. In use, the operator's hand fits in the grip or handle 6 of the housing 15, the forefinger pressing the trigger 7 to turn on the motor, which receives its power from the electric cable 8 entering the handle 6. In making a cut, the saw is pushed forward by the operator with the blade 3 rotating counterclockwise and the adjustable platform 9 sliding on the surface of the work 10 as shown in FIG. 1B. The lower guard 1 may be moved manually from its lower position shown in FIG. 1A to its out-of-the-way or upper retracted position within an upper guard 11 as in FIG. 1B.

Figure 2:
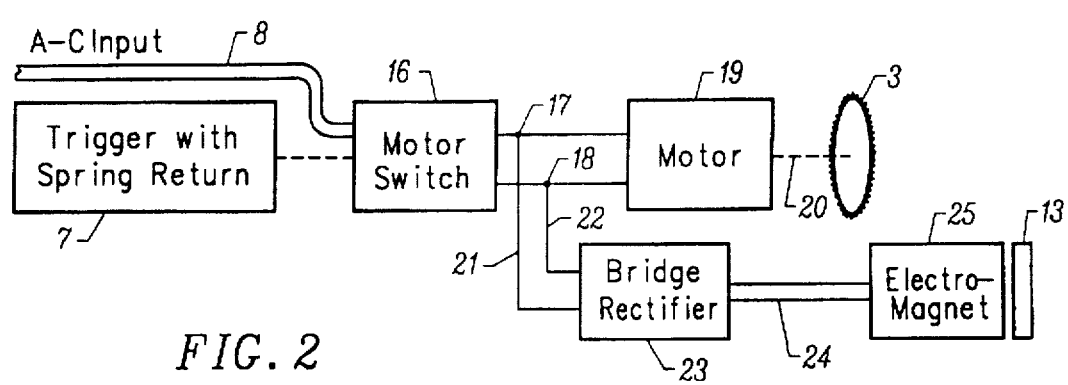
FIG. 2 is a block diagram of the simplest version of the invention.
Figure 3:
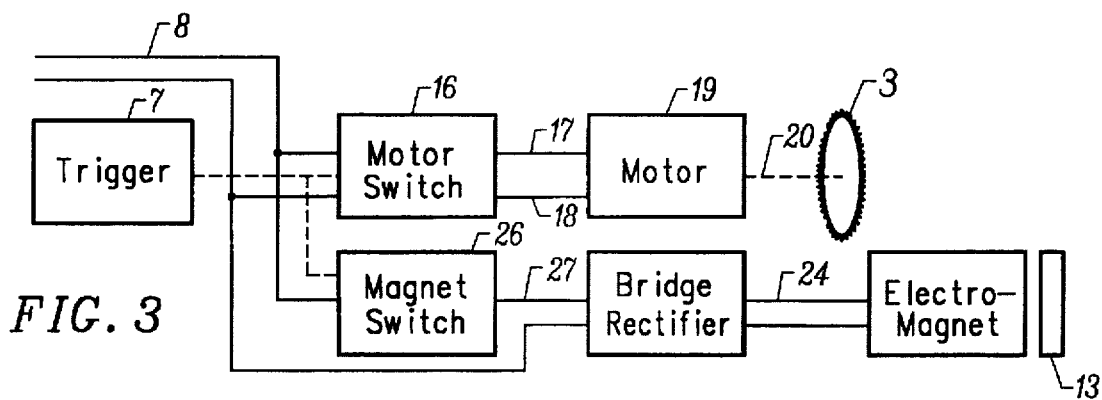
FIG. 3 is a block diagram showing a two-position switch trigger.
Figure 5:
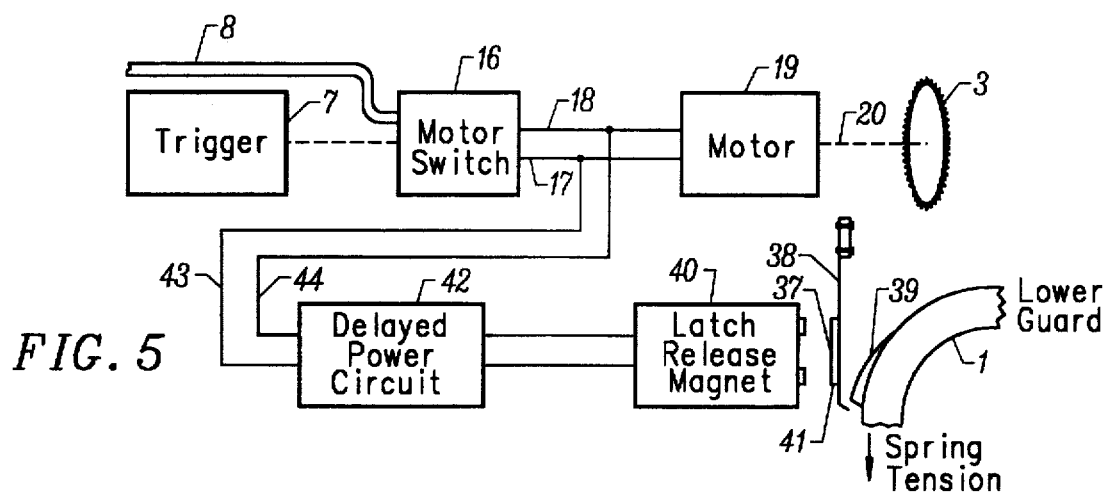
FIG. 5 is a system diagram showing a latch mechanism holding the lower guard and a magnetic latch-release device.
Figure 7:
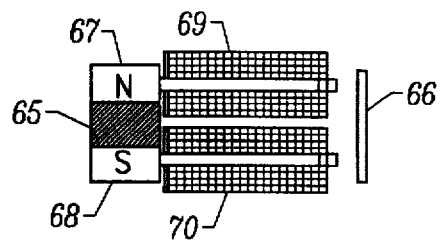
FIG. 7 is a drawing of a permanent magnet guard holder with magnetic flux-opposing release coils.

In the systems depicted by FIGS. 2, 3 and 7, employing electro or permanent magnets, especially if the device is added to an existing saw, it is convenient to mount a magnet 14, suitably encapsulated, on the upper guard 11, which is formed as part of the saw housing 15, as shown in FIG. 1 at the end of travel of the lower guard lever 12. The lever 12 may be modified to have a mating iron surface as an armature 13 which is held by the magnet 14. In the system employing a mechanical latch and a release magnet as shown in FIG. 5, the other ends of the guards may be a better location for the parts, depending on the design of a particular saw. In all cases, the circuits are small enough to fit within the hollow handle, where they are powered by the input from the cable 8.

Referring now to the block diagram of FIG. 2, pressure on trigger 7 closes the motor switch 16, connecting the input from electric cable 8 to the motor leads 17 and 18, energizing motor 19 which causes shaft 20 and saw blade 3 to rotate. The switch 16 and leads 17 and 18 are contained within the hollow handle 6, FIG. 1. In the system shown in FIG. 2, the motor wires 17 and 18 are tapped by wires 21 and 22 which are the inputs to the bridge rectifier 23. The output d-c voltage from the rectifier is brought out through a hole in handle 6 by wire pair 24 to electromagnet 25. In a new saw design incorporating this invention, the wire pair 24 would be concealed as part of the design; in the case of a retrofit it may be covered with aluminum tape or other material. Electromagnet 25 is mounted on the frame of the saw, as for example on the upper guard as shown in FIG. 1 as the holding device 2. Its armature 13 is integral with, and moves with, the lower guard as also shown in FIG. 1.

Rectifier 23 is not essential to the invention, as the electromagnet could be of the a-c type. However, a d-c magnet is more efficient and can be made smaller to perform its holding function, a few milliamperes of current being found ample to obtain the necessary tension.

To make a saw cut of the type requiring manual lifting of the lower guard, the operator uses the lever 12 (FIG. 1) to rotate the guard the extent of its limited travel where the armature comes in contact with the magnet 25. Pressure must be applied to the trigger 7 and the motor must be running; thereafter the armature will be held by the magnet as long as the motor runs, leaving a hand free to hold or manipulate the work. When motor power is removed the magnet is de-energized and the guard is freed to be pulled by its spring to its normal position as soon as it is not impeded by the work.

The system depicted by the block diagram of FIG. 3 is the same as the previous one except for the addition of switch 26 actuated by the trigger 7 together with the motor switch 16. Switch 26 has input electric power from one of the a-c mains 8 and its output 27 goes to bridge rectifier 23 together with the other a-c input wire. Switch 26 is mechanically arranged to be closed by relatively light pressure on the trigger so it can be closed while the motor is off. It will remain closed when more pressure is applied to turn on the motor. Since the magnet requires relatively low current, the switch 26 may comprise a small micro-switch at one side of the trigger mechanism.

The operation is the same as that described above in relation to FIG. 2, except that the motor need not be running when the guard is manually brought to its upper position to be held by the magnet. In this case, a slight pressure on the trigger will energize the magnet, holding the guard out of the way while the operator prepares to make a cut, having a hand free to hold the work in place. When ready, the operator may then start the motor with further pressure, and after the cut releasing the trigger will release the guard and turn off the motor.

Figure 4:
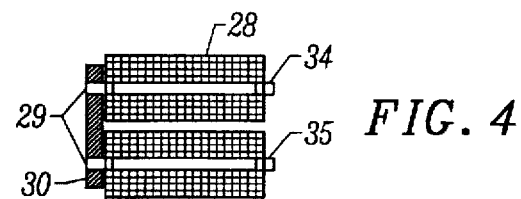
FIG. 4 is a drawing of an example of an electromagnet as used in FIGS. 2 and 3.

FIG. 4 gives a sectional and an end view of an electromagnet which has been found satisfactory in the foregoing systems. Fine magnet wire 28 is wound on two steel rods 29 of approximately 0.2 inch diameter. The rods are joined at one end by a small piece of steel 30. The coils are connected in series so as to create a magnet when carrying an electric current with north and south poles 34 and 35 at the ends of the rods. Insulated wire leads 24 (FIGS. 2 and 3) are connected to the ends of the magnet wire and the magnet is encapsulated in urethane casting resin making a unit of about 1¼×1×½ inches, with only the pole tips 34 and 35 exposed for contact with the armature 13 (FIGS. 2 and 3).

Figure 6:
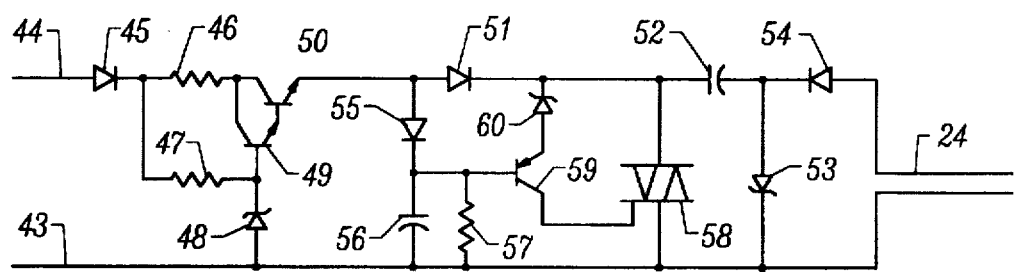
FIG. 6 is a schematic diagram of a delayed-power circuit.

FIGS. 5 and 6 shown how a mechanical latch 36 may be used to hold the guard 1 in its out-of-the-way position, automatically releasing it when the motor is turned off. The latch 36 is envisioned at being a leaf spring in this example, designated 38 in FIG. 5. It is secured at one end to a fixed part of the frame such as the upper guard 11 and so arranged as to be pushed aside by a protuberance 39 on the lower guard as it is manually brought to its upper position, then snap into a holding position as the guard 1 reaches its limit. An electromagnet 40 similar to that employed as a holding device as in FIG. 4 may be employed to open the latch 36 by attracting armature 41, a small piece 37 of iron or steel on the leaf spring.

The latch release magnet 40 is briefly energized immediately after removal of motor power by the delayed power circuit 42, an example of which is given in detail in the schematic diagram of FIG. 6. Circuit 42 is placed within the hollow saw handle and its input conductors 43 and 44 are connected to the motor leads 17 and 18 between switch 16 and motor 19. Input 44 goes to the anode of diode 45 whose cathode connects to resistors 46 and 47. Resistor 46 is connected to the collectors of the Darlington pair comprising n-p-n transistors 49 and 50, the emitter of 49 being connected to the base of transistor 50. The base of transistor 49 is fed from resistor 47, also being connected to the cathode of zener diode 48 whose anode goes to the reference input conductor 43. The emitter output of transistor 50 goes to the anode of diode 51 whose cathode connects to the positive terminal of the large electrolytic capacitor 52. The capacitor's negative terminal is connected to the positive terminal of diode 53 whose cathode goes to the reference conductor 43, and to the cathode of diode 54 whose anode connects to one of the output pair of wire 22, the other of which is connected to conductor 43. A triac 58 with its main terminals connected to the positive terminal of capacitor 52 and reference conductor 43, has its trigger connected to the collector of p-n-p transistor 59, whose emitter connects to the same terminal of capacitor 52 via zener diode 60. The base of 59 is connected to the cathode of diode 55 together with the parallel connection of capacitor 56 and resistor 57 whose other ends go to the reference conductor 43. The anode of diode 55 is connected to the emitter of transistor 50.

When the motor is turned on by switch 15, a-c voltage appears between input conductors 43 and 44, and diode 45 conducts during the positive half cycles of 44 relative to reference conductor 43. During the first few half cycles, while capacitor 52 is charging up, zener diode 48 receives insufficient voltage to cause it to conduct and all the current in resistor 47 flows into the base of transistor 49, rendering transistor 50 highly conductive. The current in resistor 46 thus flows via diode 51 into capacitor 52, whose negative terminal is clamped by diode 53 to the reference potential of reference conductor 43. The resistance of 46 is such that the compactor 52 becomes charged to the controlling voltage of zener 48 within a few cycles of input voltage. At this time, the current in resistor 47 flows in zener 48 instead of the base of 49 and the current in resistor 46 drops to the small amount required by resistor 57. Thus, the capacitor 52 remains at full charge while the motor switch is closed.

Diode 55 holds the base voltage of p-n-p transistor 59 at the level of the voltage on capacitor 52 during positive half-cycles of input voltage. During negative half-cycles, this voltage, which is maintained by capacitor 56, drops slightly due to current in resistor 57. No current flows in the collector of 59, however, as its emitter is in series with the back-biased zener diode 60.

As soon as the motor is turned off and the circuit input drops to zero, the charge on capacitor 56 is drained rapidly by resistor 57 and soon reaches a point equal to the level of the voltage on capacitor 52 minus the zener voltage of zener diode 60. When the base voltage of transistor 59 falls below its emitter level, current flows in its collector which triggers the triac 58. This acts as a switch which is closed by the sudden appearance of trigger current; it causes the discharge of capacitor 52 through the load. In this case, said load is the latch release magnet 41, via the output wire pair 24 and the diode 54.

Referring again to FIG. 5, it is observed that with this system, the operator may pull the guard out of the way before pulling the trigger, where it will remain until the motor is turned off. At that instant, the magnet is pulsed by the delayed power circuit and the latch opens, releasing the guard to be pulled back by its spring. The latch is made with a slight angle favoring its release, so the operator can, if necessary, push the guard lever and disengage the latch without starting the motor.

An alternative to the mechanical latch, employing a permanent magnet as the holding device, is illustrated in FIG. 7. In this device, a small but powerful magnet 65, containing a rare earth element such as neodymium, is located in the back end and delivers magnetic flux to the armature 66 via soft iron pole pieces 67 and 68. Coils of magnet wires 69 and 70 around these pole pieces are arranged to oppose this flux when pulsed by the delayed power circuit of FIG. 6. This unit may be mounted on the upper guard using the lower guard level as its armature similarly to the electromagnet of FIG. 4. The difference is that the holding function is performed by a permanent magnet, the coils being used only for the release. It can be made appreciably smaller and less obtrusive.

In operation, the sequence is the same as for the mechanical latch: the operator may pull the guard up before pressing the trigger switch, where it will be held by the magnet until the saw is used and turned off, when the guard immediately falls back.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a circular saw having a housing, a rotatable circular saw blade and an activatable trigger switch for rotating the saw blade when the trigger switch is activated, an upper stationary blade guard and a lower retractable blade guard that has a limited arc of rotation about the saw blade, the retractable blade guard having a normal protective position covering the saw blade and an out-of-the-way position for completing saw cuts, the improvement comprising:

a retention means for retaining the lower retractable guard in the out-of-the-way position, by non-mechanical magnetic attraction when the trigger switch is activated and the blade is rotating; and, a release means for releasing the lower retractable guard from the out-of-the-way position to the normal protective position when the activated trigger switch is deactivated, wherein the retention means comprises an electromagnet mounted on the housing and an armature mounted on the retractable guard, wherein the armature is operably positioned proximate the electromagnet when the retractable guard is manually moved to the out-of-the-way position, the electromagnet being energized when the trigger switch is activated wherein the proximately positioned armature magnetically coacts with the energized electromagnet and retains the retractable guard in the out-of-the-way position during activation of the trigger switch by magnetic attraction of the electromagnet on the housing with the armature on the retractable guard, and wherein the electromagnet has electric circuit means connected to the trigger switch for energizing the electromagnet before rotation of the blade, and the trigger switch has a two stage switch means with a first stage connected to the electric circuit means of the electromagnet for energizing the electromagnet without activation of the saw blade and a second stage for activating rotation of the saw blade while the electromagnet remains energized.

2. In a circular saw having a housing, a rotatable circular saw blade and an activatable trigger switch for rotating the saw blade when the trigger switch is activated, an upper stationary blade guard and a lower retractable blade guard that has a limited arc of rotation about the saw blade, the retractable blade guard having a normal protective position covering the sawblade and an out-of-the-way position for completing saw cuts, the improvement comprising:

a retention means for retaining the lower retractable guard in the out-of-the-way position by non-mechanical, magnetic attraction when the retractable blade guard is moved to the out of the way position before the trigger switch is activated and the blade is rotating; and, a release means for releasing the moved lower retractable guard from the out-of-way position to the normal protective position when the activated trigger switch is deactivated, wherein the retention means comprises a permanent magnet on one of the housing and retractable guard, the permanent magnet generating a magnetic field, and a magnetizable element on the other of the housing and retractable guard coacting with the permanent magnet when the retractable guard is moved to the out-of-the-way position with the magnetizable element positioned proximate the permanent magnet, and retaining said guard in said position by magnetic attraction of the magnetizable element with the permanent magnet, and, an electromagnetic means coacting with the permanent magnet for generating a cancelling electromagnetic field in opposition to the magnetic field generated by the permanent magnet when the trigger switch is deactivated.

3. The improvement of a circular saw of claim 2 wherein the electromagnetic means includes an electric circuit with capacitor means for energizing the electromagnetic means when the trigger switch is deactivated.

* * * * *